United States Patent Office 3,432,317
Patented Mar. 11, 1969

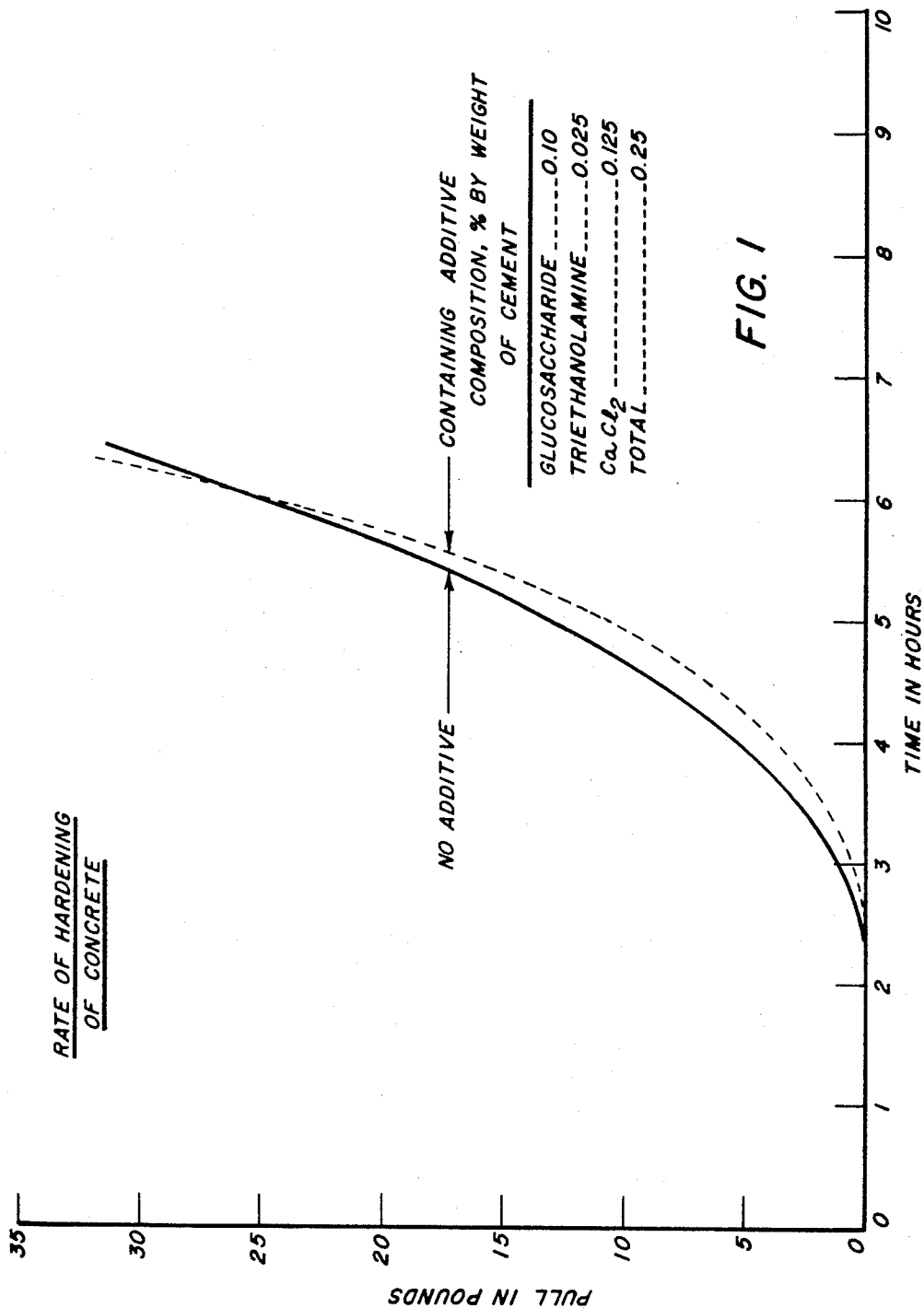

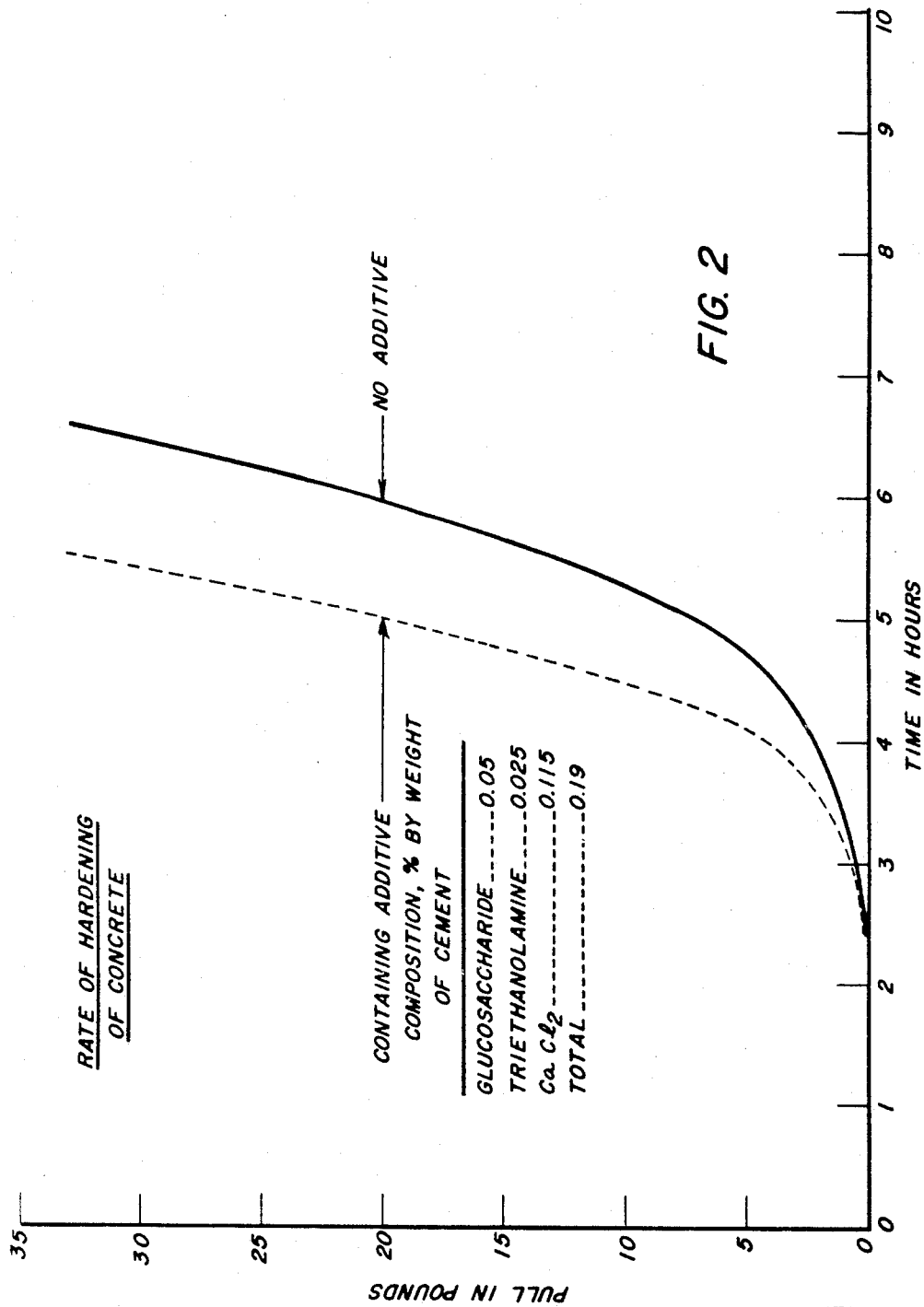

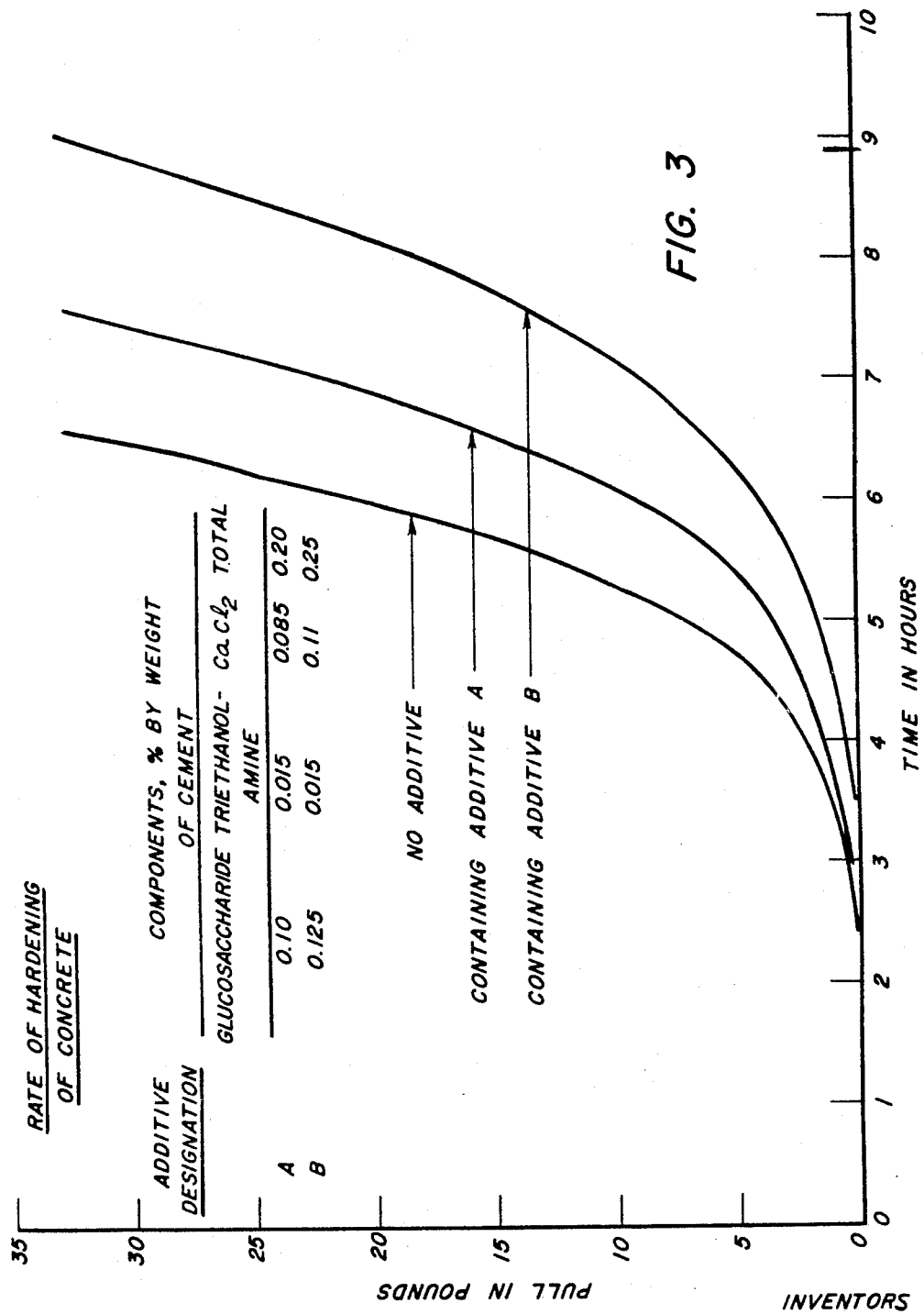

3,432,317
HYDRAULIC CEMENT MIX CONTAINING SACCHARIDE POLYMERS
Thomas M. Kelly, Chagrin Falls, Richard C. Mielenz, Beachwood, and Richard B. Peppler, Cleveland Heights, Ohio, assignors to Martin-Marietta Corporation, a corporation of Maryland
Continuation of applications Ser. No. 362,801, Apr. 27, 1964, and Ser. No. 362,976, Apr. 27, 1964. This application Jan. 25, 1967, Ser. No. 611,611
U.S. Cl. 106—92          17 Claims
Int. Cl. C04b 7/02, 19/02

ABSTRACT OF THE DISCLOSURE

A hydraulic cement mix of cement, aggregate and sufficient water to effect hydraulic setting of the cement and an additive in an amount sufficient to increase the strength of the mix when hardened. The additive comprises saccharide polymers having a size of from three glucose units to on the order of twenty-five glucose units. In addition the additive may include a water soluble chloride and a water soluble amine and prior art materials may also be included as disclosed.

---

This application is a continuation of United States patent applications Ser. No. 362,976, filed Apr. 27, 1964 and Ser. No. 362,801, filed Apr. 27, 1964, both now abandoned.

This invention relates to additives for incorporation in hydraulic cement mixes, for example, portland cement concretes and mortars, and dry mixes for making such concretes and mortars, and to the resultant hydraulic cement mixes containing the additives.

It is known in the art that simple sugars such as glucose (dextrose), maltose, sucrose, fructose, etc., or crude end products such as molasses which are preponderantly composed of simple sugars, will improve the strength of concrete or mortar when used as small percentage additions to the mixture.

The use of these sugars or end products as additives for concrete or mortar has not received commercial acceptance, however, because they are powerful retarders of cement hydration and their behavior is unpredictable. That is, a percentage addition which might be permissible with one brand of cement will frequently completely inhibit the hydration and hardening of cement of another brand, though the cements would be classified as the same type under American Society for Testing and Materials (ASTM) specification requirements. Consequently, the dangers and disadvantages inherent in the use of such simple sugars and end products in concrete or mortar restricts their use as additives.

It is also known to the art that the highly polymerized polysaccharides, such as the dextrins, will improve the strength of concrete and mortar and, because they are less severe retarders of cement hydration than the simple sugars, they can be used without danger of complete or severe inhibition of hydration and hardening. The degree of improvement that dextrins impart to concrete, however, is limited and reaches a level beyond which increasing percentage additions of dextrin produce little or no significant additional benefits.

It is an object of this invention to provide hydraulic cement additives which, unlike simple sugars, do not severely retard or inhibit the hydration or hardening of portland cement and which are greatly superior to the dextrins in the amount to which they markedly increase the strength of concrete and mortar.

Another object of the invention is to provide improved concrete and improved mortar having superior hardening characteristics and greater strength characteristics.

Another object of the invention is the provision of a novel additive for concrete and mortar to improve the characteristics thereof.

Another object of the invention is the provision of a superior additive for concrete and mortar producing results not heretofore obtainable.

Another object of the invention is the obtaining of improved concrete and mortar through the use of an additive selected from glucosaccharides having a required limited degree of polymerization to produce the maximum in desired results.

Another object of the invention is to provide a multiple-component additive for use in concrete and mortar which includes glucosaccharides having a defined degree of polymerization in combination with amines and chlorides.

Another object of the invention is to provide a multiple-component additive for concrete and mortar which substantially minimizes, if not completely eliminates, the retardation of early strength development which results in many instances with the use of the first-mentioned component of the multiple-component additive which, though in many instances may be acceptable, in many other instances is undesirable.

Another object of the invention is to provide an additive for concrete and mortar to produce maximum compressive strengths without the disadvantages of retardation of early strength development.

Accordingly, the present invention provides a composition for use as an additive for hydraulic cement mixes, which comprises saccharide polymers composed of glucose units, said saccharide polymers having a size range from three glucose units to on the order of twenty-five glucose units.

The present invention also provides a "multiple-component" additive for hydraulic cement mixes, which comprises from 1 to 40 parts of saccharide polymers composed of glucose units with said saccharide polymers having a size range from three glucose units to on the order of twenty-five glucose units, from .5 to 90 parts of a water-soluble chloride, and from .2 to 10 parts of a water-soluble amine.

Further, the present invention provides a hydraulic cement mix composition including a hydraulic cement, aggregate and sufficient water to effect hydraulic setting of the cement, which also includes the glucosaccharide additive composition in at least a small but effective amount.

The present invention also provides a hydraulic cement mix composition including a hydraulic cement, aggregate, sufficient water to effect hydraulic setting of the cement, and from about 0.02% to about 1.40% by weight of the cement of a combination of additives for modifying the properties of the mix, said combination of additives comprising from 0.01 to 0.40% by weight of cement of saccharide polymers composed of glucose units with said saccharide polymers having a size range from three glucose units to on the order of twenty-five glucose units, from 0.005 to 0.90% by weight of cement of a water-soluble chloride, and from 0.002 to 0.10% by weight of cement of a water-soluble amine.

In accordance with the teachings of the present invention, we have discovered that upon the degree of polymerization of glucosaccharides being controlled to within a fairly narrow range, such glucosaccharides are uniquely suitable and effective as additives for concrete and mortar. The use of the term glucosaccharide herein is intended to mean a saccharide polymer wherein the building units of the polymer are glucose units. By control of the degree of polymerization, the retarding effect can be controlled so that there is no danger, as in the case of simple sugars, of seriously inhibiting cement hydration and hardening. Consequently the glucosaccharides can be used in larger amounts with concomitant progressive increases in improvement of the strength of concrete and mortar, such increases being significantly greater than those obtained by similar amounts of high molecular weight glucose polymers such as dextrins.

The glucosaccharides of the invention can be derived from starch from any source such as corn, potato, wheat, rice, tapioca and from cellulose from various vegetable materials. The glucosaccharides of the present invention are the water soluble polysaccharides which contain glucose polymers in a range of from three to on the order of twenty-five units. The term "dextrins" is used to refer to the high molecular weight carbohydrates derived from vegetable material such as starch, but much less depolymerized by hydrolysis. As will be demonstrated hereinafter, as the percentage of polymers having a size range of three to ten glucose units increases within the overall range of three to twenty-five glucose units, the beneficial results in the cement mixes increase. In other words, a preferred form of our invention is an additive for the described purposes which is comprised of glucosaccharides polymerized to a degree of having a size range of three to on the order of twenty-five glucose units.

The most preferred additive composition is comprised of glucosaccharides polymerized to a degree of having a size range of three to ten glucose units within the overall range of three to twenty-five glucose units.

The starches and other materials mentioned above can be hydrolyzed by various known methods to various multiples of the glucose units. From a practical standpoint, it is not economically feasible to produce a glucosaccharide composed entirely of polymers having three to on the order of twenty-five glucose units; however, by heating, acid hydrolysis, or acid hydrolysis and enzyme treatment, hydrolyzed products can be produced which contain a substantial percentage of glucosaccharides with this preferred degree of polymerization. Such products also usually contain some glucose and maltose. It will be shown that with the glucosaccharides of the present invention present, the benefits disclosed are obtained; however, it will also be demonstrated that when materials such as glucose and maltose are present in substantial amounts, good results are obtained but on a reduced order because of the presence of these materials. By the same token it is not economically possible to produce a glucosaccharide composed entirely of polymers having three to ten glucose units but it is possible to produce a product having a large percentage of glucosaccharides with this degree of polymerization.

The upper limit of the preferred range of the polymer size of the saccharide polymers of the present invention has been defined as on the order of twenty-five glucose units. This should be understood to encompass some scope which may extend to a polymer size of on the order of thirty or down to a polymer size of on the order of twenty. This will be readily recognized by those skilled in the art, since in the acid hydrolysis of the above referred to source materials and in some instances the additional enzyme treatment thereof, it is not possible to control exactly the degree of depolymerization.

For the purpose of illustrating the teachings and advantages of the present invention a plain concrete mix was prepared and compared with similar concrete mixes to which had been added increasing amounts or dosages of a glucosaccharide having a polymer size in the range of from three to on the order of twenty-five glucose units. In all the similar concrete mixes the proportions and kinds of cement, sand, and coarse aggregates in the concrete were substantially the same. A sufficient amount of water was added to each mix to effect hydraulic setting of the cement and to produce concrete mixes of essentially the same slump. The results are tabulated below in Table I:

TABLE I

| | Percentage Addition [1] | Compressive Strength of Concrete, p.s.i. | |
|---|---|---|---|
| | | 7-day | 28-day |
| Plain concrete | None | 2,665 | 4,265 |
| Glucosaccharide (3-25 glucose units) | .05 | 2,925 | 4,595 |
| Do | .10 | 3,315 | 5,080 |
| Do | .15 | 3,360 | 5,160 |
| Do | .20 | 3,555 | 5,655 |
| Do | .30 | 3,690 | 6,260 |
| Do | .40 | 2,850 | 5,680 |

[1] By weight of cement.

It will thus be seen that varying amounts of the glucosaccharide of the present invention produce advantages in the compressive strength of cement mixes.

For the purpose of illustrating the advantages of the present invention over prior art materials, a glucosaccharide composed approximately of 55 percent of three through ten glucose unit material and 45 percent of eleven to about twenty-five glucose unit material was compared with glucose and a dextrin in concretes. In one set of such comparative tests cement No. 1 was used which had fairly rapid hardening characteristics. In the other set of tests, cement No. 2 was used which had slower hardening characteristics. Both cements met the requirements of ASTM Type I Portland cement. In each set of comparable tests the mixes were essentially of equal slump and the proportions and kinds of cement, sand, and coarse aggregate in the concrete were substantially the same. The results were as follows:

TABLE II.—CEMENT NO. 1

| | Percentage Addition [1] | Compressive Strength of Concrete, p.s.i. | |
|---|---|---|---|
| | | 7-day | 28-day |
| Plain concrete | None | 3,000 | 4,710 |
| Glucose | 0.30 | 2,670 | 5,580 |
| Glucosaccharide, (3-25 glucose units) | 0.30 | 3,450 | 5,830 |
| Dextrin | 0.30 | 3,310 | 5,380 |

CEMENT NO. 2

| | Percentage Addition [1] | Compressive Strength of Concrete, p.s.i. | |
|---|---|---|---|
| | | 7-day | 28-day |
| Plain concrete | None | 2,950 | 5,430 |
| Glucose | 0.30 | 50 | 4,030 |
| Glucosaccharide, (3-25 glucose units) | 0.30 | 3,430 | 5,840 |
| Dextrin | 0.30 | 3,110 | 5,370 |

[1] By weight of cement.

The above test data demonstrate the unpredictable effect of glucose on concretes made with different cements. With cement No. 1, the glucose gave a substantial strength improvement, though less than that achieved with this glucosaccharide. With cement No. 2, however, the glucose almost completely inhibited hardening such that after seven days of moist curing the concrete had substantially no strength, while the glucosaccharide gave substantial strength improvement. With both cements the dextrin gave strength improvement but much less than that achieved by the glucosaccharide.

The superiority of the glucosaccharide over dextrin and the leveling off of dextrin in performance in concrete with increasing percentage additions, while improvement in concrete strength continued with increasing addition of the glucosaccharide, are shown in the following examples. In all of the concrete mixes the proportions and kinds of cement, sand and coarse aggregate, and the slump of the concrete were substantially the same:

TABLE III

|  | Percentage Addition [1] | 28-day Compressive Strength of Concrete, p.s.i. |
|---|---|---|
| Dextrin | 0.05 | 5,080 |
| Do | 0.15 | 5,260 |
| Do | 0.30 | 5,380 |
| Glucosaccharide (3-25 glucose units) | 0.05 | 5,240 |
| Do | 0.15 | 5,410 |
| Do | 0.30 | 5,830 |

[1] By weight of cement.

A series of tests was made which demonstrates that the presence of the glucosaccharides of the present invention in glucose polymer additives to concrete mixes is responsible for remarkable improvements in concrete strength. The strength improvements are generally proportional to the percentage of the glucosaccharides in the additive and generally inversely proportional to the percentage of the mono- and disaccharides in the additive. Additive materials were prepared by fermenting two selected starch hydrolyzates with bakers' yeast to remove mono- and disaccharides, yielding in one case a glucosaccharide composed of three to twenty-five unit glucose polymers and in the second case a glucosaccharide composed of three to ten unit glucose polymers. Additives designated hereinafter as materials A, B, and C were prepared by combining the glucosaccharide (three to twenty-five units) with mono- and disaccharides (glucose and maltose) in the respective percentages of 100 to 0, 80 to 20 and 60 to 40. Additives designated hereinafter as materials D, E, F and G were similarly prepared by combining the glucosaccharide (three to ten units) with mono- and disaccharides (glucose and maltose) in the respective percentages of 100 to 0, 80 to 20, 60 to 40 and 50 to 50. The relative proportions of the glucosaccharides of the invention and prior art materials in the additives, which were prepared as described above, are tabulated in Table IV and V below, being expressed in the left portion of the tables as percentages of total additives and in the right portion of the tables as percentage additions by weight of cement in the concrete mixes:

TABLE IV

| Additive | Constituents, Percent of Additive | | Constituents, Percent Added By Weight of Cement | |
|---|---|---|---|---|
|  | Mono- and Di- saccharides | 3-25 Unit Gluco- saccharide | Mono- and Di- saccharides | 3-25 Unit Gluco- saccharide |
| Material A | 0 | 100 | 0.00 | 0.30 |
| Material B | 20 | 80 | 0.06 | 0.24 |
| Material C | 40 | 60 | 0.12 | 0.18 |

TABLE V

| Additive | Constituents, Percent of Additive | | Constituents, Percent Added By Weight of Cement | |
|---|---|---|---|---|
|  | Mono- and Di- saccharides | 3-10 Unit Gluco- saccharide | Mono- and Di- saccharides | 3-10 Unit Gluco- saccharide |
| Material D | 0 | 100 | 0.00 | 0.30 |
| Material E | 20 | 80 | 0.06 | 0.24 |
| Material F | 40 | 60 | 0.12 | 0.18 |
| Material G | 50 | 50 | 0.15 | 0.15 |

These materials (A, B, C, D, E, F and G) were then each added to concrete mixes at the same addition rate, namely, 0.30% by weight of cement. In all concrete mixes the proportions and kinds of cement, sand, coarse aggregate, and the slumps of the concrete were substantially the same. The result of the compressive strength tests on the concrete mixes thus prepared are shown in Table VI below:

TABLE VI

| Additive | Percentage Addition [1] | Compressive Strength, p.s.i. | |
|---|---|---|---|
|  |  | 7-day | 28-day |
| Plain concrete | None | 3,050 | 4,990 |
| A | .30 | 3,660 | 5,490 |
| B | .30 | 3,380 | 5,420 |
| C | .30 | 3,270 | 5,360 |
| D | .30 | 3,870 | 5,820 |
| E | .30 | 3,600 | 5,640 |
| F | .30 | 3,410 | 5,570 |
| G | .30 | 270 | 5,170 |

[1] By weight of cement.

The results of these tests very clearly illustrate the advantages obtained by the addition of the glucosaccharides of the present invention even with the presence of substantial amounts of the less desirable materials such as the mono- and disaccharides. These tests also serve to point out the advantages of utilizing a glucosaccharide which is comprised of glucose polymers in the preferred range from three to ten units as distinguished from the broader range of preferred material, namely from three to twenty-five glucose units. The advantages are demonstrated by the compressive strength results obtained in utilizing material D as distinguished from material A. The results of the tests indicate a maximum preferable upper limit of mono- and disaccharides in the additive composition in order to produce preferred results under the teachings of the present invention. In the use of the glucosaccharides of the present invention this upper limit of mono- and disaccharides is preferably not in excess of 50% of the total additive composition and more desirably on the order of 40% or less. The above tests clearly indicate the desirability of the use of the three to twenty-five unit glucosaccharides of the present invention and also illustrate that the percentage of the three to ten unit glucosaccharide material should desirably be as high as possible. These tests also illustrate that good results are obtained even in the presence of substantial amounts of the less desirable material.

The importance of materials polymerized in the range of three to on the order of ten glucose units was further demonstrated in concrete tests. A series of tests was conducted to illustrate the comparative effectiveness of the more preferred range of glucosaccharides under the present invention, namely, those glucosaccharides having from three to ten glucose building units as compared to the broader range of glucosaccharides under the present invention, namely, those glucosaccharides having from three to twenty-five glucose building units. A material H was prepared which contained approximately 45% glucosaccharides having a polymer size range of three to ten units and 55% glucosaccharides having a polymer size range of eleven to twenty-five units. A material I was prepared which had 100% glucosaccharides in the three to ten unit range and no glucosaccharides in the eleven to twenty-five unit range. In these tests the proportions and kinds of cement, sand, and coarse aggregate, and the slumps of the concrete were substantially the same.

TABLE VII

| Additive Material | Percentage Addition [1] | Compressive Strength of Concrete, p.s.i. | |
|---|---|---|---|
|  |  | 7-days | 28-days |
| No. H | .05 | 3,250 | 5,120 |
| No. I | .05 | 3,290 | 5,260 |
| No. H | .10 | 3,320 | 5,170 |
| No. I | .10 | 3,610 | 5,560 |
| No. H | .20 | 3,950 | 6,180 |
| No. I | .20 | 4,220 | 6,330 |
| No. H | .30 | 3,760 | 6,390 |
| No. I | .30 | 4,130 | 6,650 |
| No. H | .40 | 3,270 | 5,830 |
| No. I | .40 | 3,470 | 6,420 |

[1] By weight of cement.

This series of tests, at the addition rates indicated, illustrates further the desirability of keeping the glucosaccharides of the present invention in the preferred composition range, namely, having three to ten glucose building units, at as high a percentage as possible. These tests also indicate an upper desired limit of percentage addition of on the order of .40% to .50% based on the weight of the cement. This preferred upper limit of about .40% is usually in the case of where only the glucosaccharides of the present invention are used alone. However, in combination with other materials, it may be possible to exceed this amount even though not economically desirable to do so. As a result, even though this upper limit is a desirable limit, the coverage afforded herein should not be limited thereto. It has also been found that although more desirable results do not occur until on the order of .05% of glucosaccharides (3–25 unit material) is added, some benefit is gained by the addition of a small but effective amount of these glucosaccharides, for example on the order of .01 or .02% by weight of cement. As a result, the lower dosage limit is best described as a small but effective amount. While the glucose polymers referred to herein may be complex structures, they contain primarily polymers of D-glucose units.

As mentioned above, substantial and progressively increasing improvements in the strength of concretes and mortars can be achieved by the use of these glucosaccharides as increasing amounts are added to the cement mixtures. In order to achieve these maximum strength improvements, however, some degree of retardation of early strength development is unavoidable even though this additive in no sense inhibits cement hydration and hardening as in the case of simple sugars. Thus, even though the retardation is much less severe and the strengths obtained are much higher than those resulting from the use of simple sugars, it is in many instances desirable and advantageous to achieve these pronounced improvements in strength without the retardation of early strength development.

The advantages which have been set fotrh hereinabove, may be accomplished in accordance with the teachings of the present invention, which in a most important and preferred embodiment utilizes the new combination of the defined glucosaccharides together with amines and chlorides. While amines and chlorides have been used to function as accelerators of cement hydration, their effects, however, are usually apparant at early ages, and at 28 days age and thereafter their effects on strength of concrete and mortar are relatively insignificant, particularly when used in the relatively small amounts as recommended in the present invention. However, when used in the multiple-component additive composition of the present invention, the advantages of these additional components are significantly greater at later stages of hardening such as at 28 days and thereafter.

Combination of the amines, chlorides, and the defined glucosaccharides, all in relatively low percentage additions, have been found to produce unexpected improvements in the strength of concrete and mortar, which improvements would reuqire large percentage additions of the glucosaccharides alone with a somewhat undesirable and sometimes unacceptable retardation of hardening and early strength development. The unexpected improvements of this embodiment of the present invention cannot be achieved by the small addtiions of the amines and chlorides alone.

The amines comprising the second component of the combination are water-soluble, and include the primary, secondary, and tertiary alkyl and alkanol or hydroxy alkyl amines. Any salt or mineral acid addition product of such alkyl or alkanol amine may also be used. Trietthanolamine is preferred from the standpoint of availability and cost.

The third component of the multiple-component additive of the present invention is what has been referred to above as chlorides. Included in this class are the alkali, alkaline earth metal chlorides as well as ammonium chlorides. From the standpoint of economics, it has been found that calcium chloride is the most desirable.

The amounts of the three components re'ative to each other in accordance with the teachings of the present invention may be varied over a wide range while still achieving the benefits of the present invention to varying degrees. To meet varying concrete placing conditions such as the need for rapid or slow setting, or high or low placing temperatures, the three components may be varied over the following wide range expressed as percentage by weight of cement:

| | Percent by weight of cement |
|---|---|
| Glucosaccharide (3–25 glucose units) | 0.01–0.40 |
| Water-soluble amine | 0.002–0.10 |
| Water-soluble chloride | 0.005–.90 |

For the majority of applications, the relative amounts of the three components expressed as percentages by weight of cement should be within the following preferred range of proportions:

| | Percent by weight of cement |
|---|---|
| Glucosaccharides (3–25 glucose units) | 0.05–0.25 |
| Water-soluble amine | 0.01–0.05 |
| Water-soluble chloride | 0.015–0.30 |

The water-soluble chlorides referred to above are preferably used in the combination of the present invention within the preferred limits as set forth above. However, amounts of chloride of 1 percent or 2 percent, or even more, can be used for placing the concrete mix in severely cold weather and sometimes 2 percent of calcium chloride may be used to substantially cut down the time for the setting of a cement mix. When chlorides are used in such amounts, benefits of the invention are still obtained, but the excess is used for the purposes abovementioned rather than to obtain the benefits of the invention. Therefore, for the purposes of this application the maximum amount of a chloride such as calcium chloride for obtaining the benefits of the present invention will be considered to be on the order of .90 percent. Larger amounts of such a chloride may be useful for other purposes, but if an amount of chloride be used up to on the order of .90 percent together with the other additive ingredients in the amounts set forth herein, use is being made of the invention.

The total weight of the three component additives within the wide range relative to each other as given above may be incorporated in hydraulic cement mixes in very small amounts to produce improved results. For example, on the order of 0.02 pound, which may be referred to as a small but effective amount, up to 1.4 pounds of the additive mixture may be incorporated in the cement mixes per sack of cement or in other words, from about 0.02% (for example 0.017% as shown above and in Table XIII) to about 1.40% by weight of the cement.

Within the preferred range which has been given hereinabove, and for the majority of applications, the mixtures of the three components should be incorporated in hydraulic cement mixes in amounts from about 0.075% to 0.60% by weight of the cement.

A group of tests was conducted which illustrates the effects of the three component additive on the compressive strength of concrete and illustrates the advantages and desirable features of the present invention. The results of the tests are illustrated in Tables VIII through XIV hereinbelow. Each of the groups of tests as set forth in Tables VIII through XIV compare a plain mix of portland cement, sand, and coarse aggregate with similar mixes containing the three component additive of the present invention. Each of the concrete mixes contained sufficient water to effect hydraulic setting of the cement and to produce workable, plastic mixes of essentially the same slump. In all concrete mixes the proportions and kinds of cement, sand, and coarse aggregate were substantially the same. The glucosaccharides utilized in the tests were starch hydrolyzates. One of the glucosaccharides contained approximately 82% of polymers having three through twenty-five glucose units and approximately 18% of mono- and disaccharide units. The second glucosaccharide contained approximately 67% of polymers having three through fifteen glucose units and approximately 33% mono- and disaccharide units. The triethanolamine which was utilized in the following tests was comprised substantially of triethanolamine with minor amounts of diethanolamine and monoethanolamine. The calcium chloride utilized was approximately 98% anhydrous.

As mentioned hereinabove, it has been found heretofore that advantageous results occur upon the addition of a small but effective amount of the multiple-component additive, such as, for example, 0.02%, but that the more desirable range is from 0.075% to 0.60% by weight of cement. Also, as relates to the upper addition limit of the additive, it has been found that while as high as 1.40% total additive it can be used, it is usually economically advantageous to stay within the more narrow preferred range.

The data shown in Table XII and XIII below illustrate

TABLE VIII

| Components, Percent By Weight of Cement | | | | Compressive Strength, p.s.i. | |
|---|---|---|---|---|---|
| Glucosaccharide (82%, 3-25 glucose units) | Triethanolamine | Calcium Chloride | Total Additive | 7-day | 28-day |
| SERIES 1 | | | | | |
| Plain mix (without additive) | | | | 2,850 | 4,595 |
| 0.075 | 0.013 | 0.112 | 0.20 | 3,680 | 5,330 |
| SERIES 2 | | | | | |
| Plain mix (without additive) | | | | 2,615 | 4,330 |
| 0.10 | 0.02 | 0.08 | 0.20 | 3,685 | 5,385 |
| SERIES 3 | | | | | |
| Plain mix (without additive) | | | | 2,535 | 4,325 |
| 0.10 | 0.015 | 0.135 | 0.25 | 3,585 | 5,305 |
| SERIES 4 | | | | | |
| Plain mix (without additive) | | | | 3,140 | 4,700 |
| 0.065 | 0.02 | 0.065 | 0.15 | 3,840 | 5,480 |

TABLE IX

| Components, Percent By Weight of Cement | | | | Compressive Strength, p.s.i. | |
|---|---|---|---|---|---|
| Glucosaccharides (68%, 3-15 glucose units) | Triethanolamine | Calcium Chloride | Total Additive | 7-day | 28-day |
| Plain mix (without additive) | | | | 2,660 | 4,225 |
| .06 | .01 | .03 | .10 | 3,285 | 4,905 |
| .09 | .015 | .045 | .15 | 3,570 | 5,185 |
| .12 | .02 | .06 | .20 | 3,785 | 5,365 |
| .15 | .025 | .075 | .25 | 3,875 | 5,600 |

TABLE X

| Components, Percent By Weight of Cement | | | | Compressive Strength, p.s.i. | |
|---|---|---|---|---|---|
| Glucosaccharides (68%, 3-15 glucose units) | Triethanolamine | Calcium Chloride | Total Additive | 7-day | 28-day |
| Plain mix (without additive) | | | | 2,740 | 4,295 |
| .08 | .016 | .104 | .20 | 3,575 | 5,180 |
| .10 | .015 | .135 | .25 | 3,795 | 5,395 |
| .16 | .032 | .208 | .40 | 4,055 | 5,715 |
| .20 | .03 | .27 | .50 | 4,145 | 5,805 |
| .24 | .048 | .312 | .60 | 4,315 | 6,075 |

TABLE XI

| Components, Percent By Weight of Cement | | | | Compressive Strength, p.s.i. | |
|---|---|---|---|---|---|
| Glucosaccharides (67%, 3-15 glucose units) | Triethanolamine | Calcium Chloride | Total Additive | 7-day | 28-day |
| Plain mix (without additive) | | | | 3,450 | 4,850 |
| .03 | .02 | .025 | .075 | 3,920 | 5,280 |
| .06 | .025 | .115 | .20 | 4,320 | 5,720 |
| .10 | .03 | .12 | .25 | 4,570 | 5,810 |
| .15 | .03 | .12 | .30 | 4,710 | 6,260 |
| .20 | .025 | .075 | .30 | 4,650 | 6,300 |
| .25 | .025 | .025 | .30 | 4,600 | 6,380 |
| .225 | .025 | .05 | .30 | 4,760 | 6,410 |
| .20 | .05 | .10 | .35 | 4,850 | 6,510 |

The results of Table VIII, Table IX, Table X, and Table XI demonstrate the desirable effect of the multiple-component additive of the present invention in improving the compressive strength of concrete. It will be noted that as the total additive increased from 0.10% to 0.60% within the preferred range, based on the weight of the cement in the mix, the 7- and 28-day compressive strengths increased to a highly desirable degree.

the improvement in concrete strength obtained by addition of small but effective amounts of the three component additive and also demonstrate the remarkable strength improvements obtained by the addition of relatively large amounts of the three component additive. In all concrete mixes the proportions and kinds of cement, sand, and coarse aggregate, and the slumps of the concrete mixes were substantially the same.

TABLE XII

| Components, Percent By Weight of Cement | | | | Compressive Strength, p.s.i. | |
|---|---|---|---|---|---|
| Glucosaccharides (68%, 3-15 glucose units) | Trieth-anol-amine | Calcium Chloride | Total Additive | 7-day | 28-day |
| Plain mix (without additive) | | | | 3,080 | 4,710 |
| .01 | .005 | .01 | .025 | 3,380 | 4,990 |
| .01 | .01 | .01 | .03 | 3,630 | 5,190 |
| .02 | .015 | .015 | .05 | 3,740 | 5,299 |
| .03 | .01 | .01 | .05 | 3,700 | 5,150 |
| .03 | .02 | .025 | .075 | 3,810 | 5,450 |
| .025 | .025 | .525 | .80 | 4,610 | 6,380 |
| .025 | .025 | .725 | 1.00 | 4,780 | 6,480 |
| .025 | .025 | .975 | 1.25 | 4,780 | 6,670 |

TABLE XIII

| Components, Percent By Weight of Cement | | | | Compressive Strength, p.s.i. | |
|---|---|---|---|---|---|
| Glucosaccharides (67%, 3-15 glucose units) | Trieth-anol-amine | Calcium Chloride | Total Additive | 7-day | 28-day |
| Plain mix (without additive) | | | | 2,960 | 4,620 |
| .01 | .002 | .005 | .017 | 3,290 | 4,970 |
| .05 | .025 | .01 | .085 | 4,050 | 5,450 |
| .25 | .05 | .30 | .60 | 4,710 | 6,180 |
| .30 | .05 | .90 | 1.25 | 5,570 | 7,180 |
| .40 | .10 | 2.00 | 2.50 | 5,400 | 6,960 |

The results illustrated in Table XIV below show a comparison of varying the amounts of two components of the multiple-component mix without varying the component of the defined glucosaccharide to illustrate the effects on the compressive strength of two different types of cements, both of which met ASTM Type I specification requirements:

TABLE XIV

| Components, Percent By Weight of Cement | | | | Compressive Strength, p.s.i. | | | |
|---|---|---|---|---|---|---|---|
| Glucosaccharides (67%, 3-15 glucose units) | Trieth-anol-amine | Calcium Chloride | Total Additive | Cement No. 1 | | Cement No. 2 | |
| | | | | 7-day | 28-day | 7-day | 28-day |
| Plain mix (without additives) | | | | 2,955 | 4,575 | 2,160 | 3,615 |
| .10 | .02 | .05 | .17 | 3,850 | 5,540 | 3,815 | 5,295 |
| .10 | .02 | .10 | .22 | 3,960 | 5,585 | 3,905 | 5,375 |
| .10 | .02 | .15 | .27 | 3,990 | 5,690 | 3,925 | 5,315 |
| .10 | .03 | .15 | .28 | 4,045 | 5,680 | 4,065 | 5,490 |

The results of these compressive strength tests indicate the advantages of the multiple-component additive of the present invention and indicate the desirability and effectiveness of an additive containing all of the components of the present invention.

The advantages of the multiple-component additive are further demonstrated in the results of rate of hardening tests shown in FIGURES 1, 2 and 3. This test method is widely used for elucidating the hardening characteristics of concrete mixes from the moment cement and water come into contact until the concrete has developed measurable compressive strength. The test method is described in a paper by T. M. Kelly and D. E. Bryant which is printed in the 1957 proceedings, American Society for Testing and Materials. It may be noted that, by varying the relative proportions of the three components of the additive of the present invention, the rate of hardening of the concrete may be varied to meet varying placing temperature conditions or job requirements. For example, in FIGURE 1 the three components of the additive have been so proportioned that the rate of hardening of the two concrete mixes, one containing no additive and the second containing the additive composition indicated, have essentially equal rates of hardening. In FIGURE 2 the three components of the additive composition have been proportioned as indicated so that the concrete mix containing the additive composition hardens at a faster rate than the concrete mix without additive. Such rapid hardening characteristics may be desirable because of low ambient temperatures during concrete placement or may be desired to expedite placing and finishing operations.

In FIGURE 3 the three components of the additive compositions have been proportioned as indicated so that the concrete mixes containing the additive compositions harden at a slower rate than the concrete mix without additive. Such a retardation of hardening rate may be desirable because of high ambient temperatures during concrete placement or may be required in pouring concrete deck slabs on cambered steel bridge girders where hardening of a portion of the slab prior to completion of placement of concrete for the entire slab will cause cracks in the hardened portion as the increasing weight of concrete reduces the camber in the steel girders.

All of these necessary variations in rate of hardening of concrete, which may be required because of the temperature conditions or the job requirements cited above, can be obtained without sacrificing the remarkable advantages and effectiveness of the multiple-component additive in increasing the compressive strength of concrete.

While the foregoing description of the invention herein describes the use of the material of the present invention and in its preferred dosage range, in mixes combined with cement, aggregate, and sufficient water to effect hydraulic setting of the cement and produce a workable, plastic mix, it should be understood by those skilled in the art that still other materials in the nature of additives may be included in the cement mixes for the purpose for which they are normally employed. Such other additives for example may be air-entraining agents, air-detraining agents, pozzuolanic materials, fly-ash, coloring materials, and water repellents. Other well-known additive materials may be used to accomplish their normal and intended function. It has also been found preferable to limit the mono- and disaccharides present so that they do not exceed the amount of the defined inventive glucosaccharides present in order to produce the best results under the present teachings.

While the invention has been described and illustrated by reference to various specific materials and procedures, it is to be understood that the invention is not restricted to the particular materials and procedures selected for that purpose. Numerous variations in such details can be employed, as will be appreciated by those skilled in the art. What is claimed is:

1. A hydraulic cement mix including portland cement, aggregate, and sufficient water to effect hydraulic setting of the cement, and an additive, said additive comprising saccharide polymers, each said saccharide polymer being composed of glucose units, said saccharide polymers having a size from three glucose units to on the order of twenty-five glucose units, said additive being present in an amount in the range from .05% to .40% based on the weight of cement.

2. A hydraulic cement mix as claimed in claim 1 wherein the larger proportion of said saccharide polymers have from three glucose units to on the order of ten glucose units.

3. A hydraulic cement mix including portland cement, aggregate, and sufficient water to effect hydraulic setting of the cement, and an additive, said additive comprising saccharide polymers, each said saccharide polymer being composed of glucose units, said saccharide polymers having a size from three glucose units to on the order of twenty-five glucose units, said additive being present in an amount sufficient to increase the strength of the mix when hardened.

4. A hydraulic cement mix as claimed in claim 3 wherein the larger proportion of said saccharide polymers have from three glucose units to on the order of ten glucose units.

5. A hydraulic cement mix including portland cement, aggregate, and sufficient water to effect hydraulic setting of the cement, and an additive, said additive comprising saccharides made up of glucose units and saccharide polymers of glucose units with at least 50% of said saccharides being composed of saccharide polymers having a size from three glucose units to on the order of twenty-five glucose units, said saccharide polymers having a size from three glucose units to on the order of twenty-five glucose units being present in an amount in the range from .05% to .40% based on the weight of the cement.

6. A hydraulic cement mix including portland cement, aggregate, and sufficient water to effect hydraulic setting of the cement, and an additive, said additive comprising saccharides made up of glucose units and saccharide polymers of glucose units with at least 50% of said saccharides being composed of saccharide polymers having a size from three glucose units to on the order of twenty-five glucose units, said additive being present in an amount sufficient to increase the strength of the mix when hardened.

7. A hydraulic cement mix including portland cement, aggregate, and sufficient water to effect hydraulic setting of the cement, and an additive, said additive comprising saccharide polymers, each said saccharide polymer being composed of glucose units, said saccharide polymers having a size from three glucose units to on the order of twenty-five glucose units, said additive being present in an amount in the range from .01% to .50% based on the weight of cement.

8. A hydraulic cement mix including portland cement, aggregate, sufficient water to effect hydraulic setting of the cement, and a combination of additives for modifying the properties of the mix, said combination of additives being added in a total amount from about .02% to about 1.40% by weight of the cement and comprising from .01% to .40% by weight of cement of saccharide polymers composed of glucose units with said polymers having a size range from 3 glucose units to on the order of 25 glucose units, from .005% to .90% by weight of cement of a water-soluble chloride, said chloride being selected from the group consisting of alkali metal chlorides, alkaline earth metal chlorides and ammonium chloride and from .002% to .10% by weight of cement of a water-soluble amine, said amine being selected from the group consisting of alkyl and alkanol amines.

9. A hydraulic cement mix in accordance with claim 8, wherein said water-soluble chloride is calcium chloride.

10. A hydraulic cement mix in accordance with claim 8 wherein said water-soluble amine is triethanolamine.

11. A hydraulic cement mix comprising portland cement, aggregate, sufficient water to effect hydraulic setting of the cement, and a combination of additives for modifying the properties of the mix, said combination of additives being added in a total amount from about .075% to about 0.60% by weight of the cement and comprising from .05% to .25% by weight of cement of saccharide polymers composed of glucose units with said polymers having a size range from 3 glucose units to on the order of 25 glucose units, from .015% to .30% by weight of cement of a water-soluble chloride, said chloride being selected from the group consisting of alkali metal chlorides, alkaline earth metal chlorides and ammonium chloride and from .01% to .05% by weight of cement of a water-soluble amine, said amine being selected from the group consisting of alkyl and alkanol amines.

12. A hydraulic cement mix as claimed in claim 11 wherein a substantial proportion of said polymers are from 3 to on the order of 10 glucose units.

13. An additive for portland cement mixes comprising from 1 to 40 parts of saccharide polymers composed of glucose units with said polymers having a size range from 3 glucose units to on the order of 25 glucose units, from .5 to 90 parts of a water-soluble chloride, said chloride being selected from the group consisting of alkali metal chlorides, alkaline earth metal chlorides and ammonium chloride and from .2 to 10 parts of a water-soluble amine, said amine being selected from the group consisting of alkyl and alkanol amines.

14. An additive in accordance with claim 13 wherein said water-soluble chloride is calcium chloride.

15. An additive in accordance with claim 14 wherein said water-soluble amine is triethanolamine.

16. An additive for portland cement mixes as claimed in claim 13 wherein a substantial proportion of said polymers are from 3 to on the order of 10 glucose units.

17. A portland cement mix including portland cement, aggregate, sufficient water to effect hydraulic setting of the cement, and a combination of additives for modifying the properties of the cement, said combination of additives being added in a total amount from about .02% to about 1.40% by weight of cement, and comprising saccharides made up of glucose units and saccharide polymers of glucose units with at least 50% of said saccharides being composed of saccharide polymers having a size range from three glucose units to on the order of twenty-five glucose units, said saccharide polymers having a size range from three glucose units to on the order of twenty-five glucose units being present in an amount from .01% to .40% by weight of cement, from .005% to .90% by weight of cement of a water-soluble chloride, said chloride being selected from the group consisting of alkali metal chlorides, alkaline earth metal chlorides and ammonium chloride and from .002% to .10% by weight of cement of a water-soluble amine, said amine being selected from the group consisting of alkyl and alkanol amines.

References Cited

UNITED STATES PATENTS

| 2,418,431 | 4/1947 | Scripture | 106—92 |
| 2,823,135 | 2/1958 | Toulmin | 106—92 |
| 2,927,033 | 3/1960 | Benedict et al. | 106—92 |
| 3,090,692 | 5/1963 | Kelly et al. | 106—92 |
| 2,374,628 | 4/1945 | Swayze | 106—92 |

TOBIAS E. LEVOW, *Primary Examiner.*

S. F. MOTT, *Assistant Examiner.*

U.S. Cl. X.R.

106—97, 314